United States Patent
Tidewell

[11] 3,880,440
[45] Apr. 29, 1975

[54] STEERABLE TRUCK WITH REVERSIBLE CASTERING WHEEL STRUCTURE FOR TRAILERS

[76] Inventor: Hubert Tidewell, Box 57, Wellington, Utah 84542

[22] Filed: Aug. 12, 1974

[21] Appl. No.: 496,901

[52] U.S. Cl.............................. 280/81 A; 280/448
[51] Int. Cl............................................. B62d 13/06
[58] Field of Search..... 280/448, 446 R, 81 A, 80 R

[56] References Cited
UNITED STATES PATENTS

| | | | |
|---|---|---|---|
| 2,491,063 | 12/1949 | Strong | 280/448 |
| 2,847,228 | 8/1958 | Hall | 280/81 A |
| 3,520,549 | 7/1970 | De Lay | 280/448 X |

*Primary Examiner*—Leo Friaglia
*Attorney, Agent, or Firm*—B. P. Fishburne, Jr.

[57] ABSTRACT

A swiveled truck for long semi-trailers or plural trailers in a caravan has a unique caster-like turning action, allowing controlled turning of the long caravan in a forward direction or during backing up. A pair of superposed plates connected by king pins are mounted to the bottom of the trailer body. An intervening swiveled frame attached by a towing yoke to the underlying wheeled truck frame is adapted to shift in relation to the two king pins to provide castering of the truck during forward travel or while backing up.

9 Claims, 5 Drawing Figures

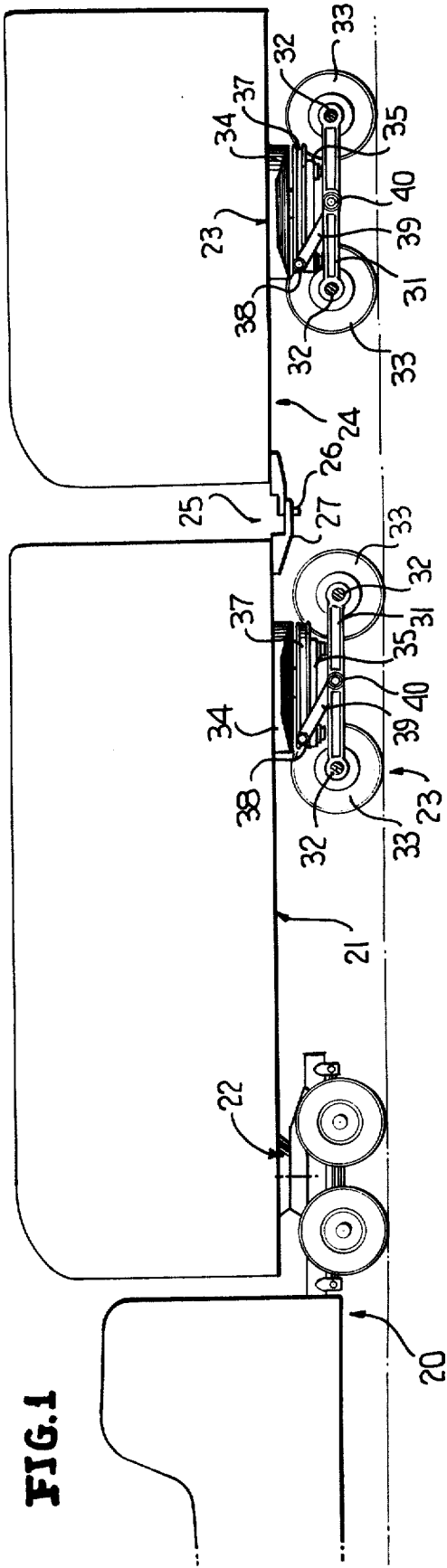
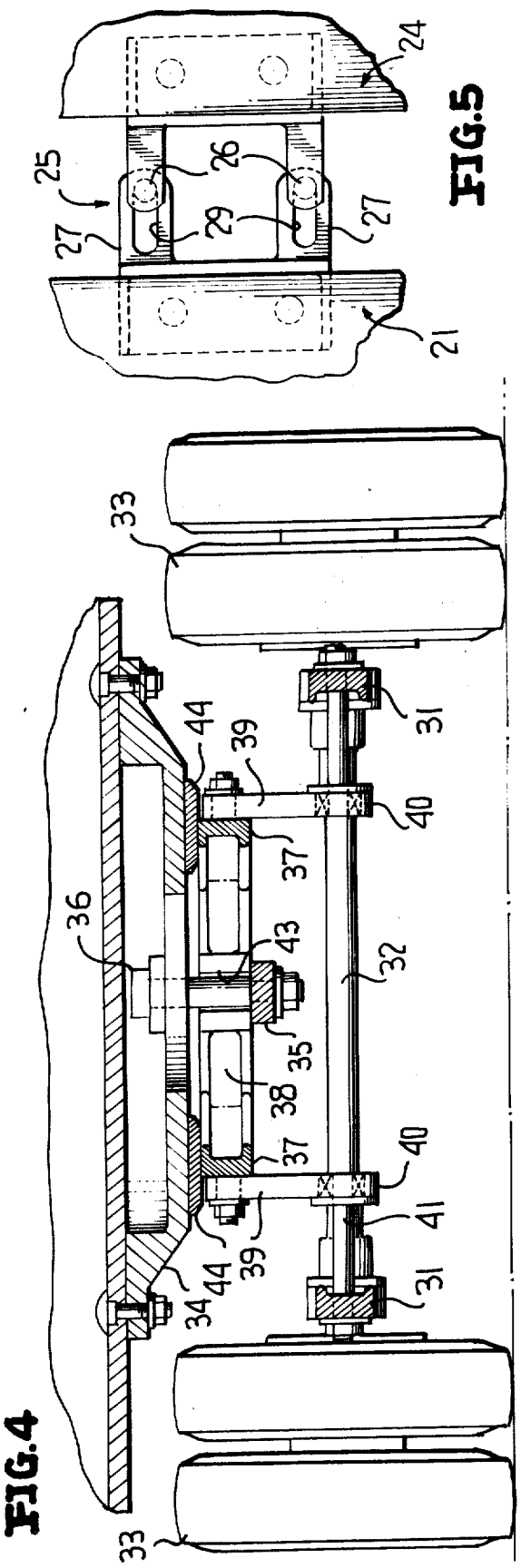

3,880,440

STEERABLE TRUCK WITH REVERSIBLE CASTERING WHEEL STRUCTURE FOR TRAILERS

BACKGROUND OF THE INVENTION

With the ever-increasing movement of freight by trucks on modern superhighways, a growing need has developed for larger caravans including longer semi-trailers and multiple trailer rigs, limited only by state and federal highway regulations. With this need in view, the objective of the invention is to provide a swiveled steering truck for long semi-trailers or for articulated trailer caravans which will allow safe and secure turning of the caravan while moving in the forward direction or while backing up, on the highway or in close quarters. The swiveled truck forming the subject matter of the invention has the unique ability to function as a caster for the truck body when the latter is moving in either direction. As a caster, no control cables or rigid links need be utilized between the forward towing vehicle and the swiveled steering truck. Like any caster, the truck is self-centering automatically during straightaway travel and will swivel or turn automatically only the precise amount necessary to negotiate gradual curves or sharp turns with safety. Due to the geometry of the castering system, the trucks exhibit automatic control without danger of oversteering or jackknifing.

More particularly, the invention makes use of a unique arrangement of spaced king pins mounted rigidly with a pair of superposed plates on the semi-trailer or on plural articulated trailer bodies. These king pins cooperate with a swiveled frame attached to the wheeled frame of the steering truck in a shifting mode to form a caster pivot when the caravan is moving forwardly or backing up. In this connection, the spaced king pins shift into or out of cooperating slots on the swiveled frame structure to establish alternate castering pivots between the steering truck and the trailer or semi-trailer body. The shifting operation and the dual castering mode of operation is completely automatic and safe and requires no special action by the caravan driver, nor does it interfere with normal turning or straightaway driving operations.

Other features and advantages of the invention will become apparent during the course of the following description.

BRIEF DESCRIPTION OF DRAWING FIGURES

FIG. 1 is a side elevation of an articulated vehicle caravan equipped with the caster action steering trucks according to the invention.

FIG. 4 is a vertical section taken on line 4—4 of FIG. 2.

FIG. 5 is a fragmentary plan view of an articulated coupling between trailer units.

DETAILED DESCRIPTION

Figure 2:
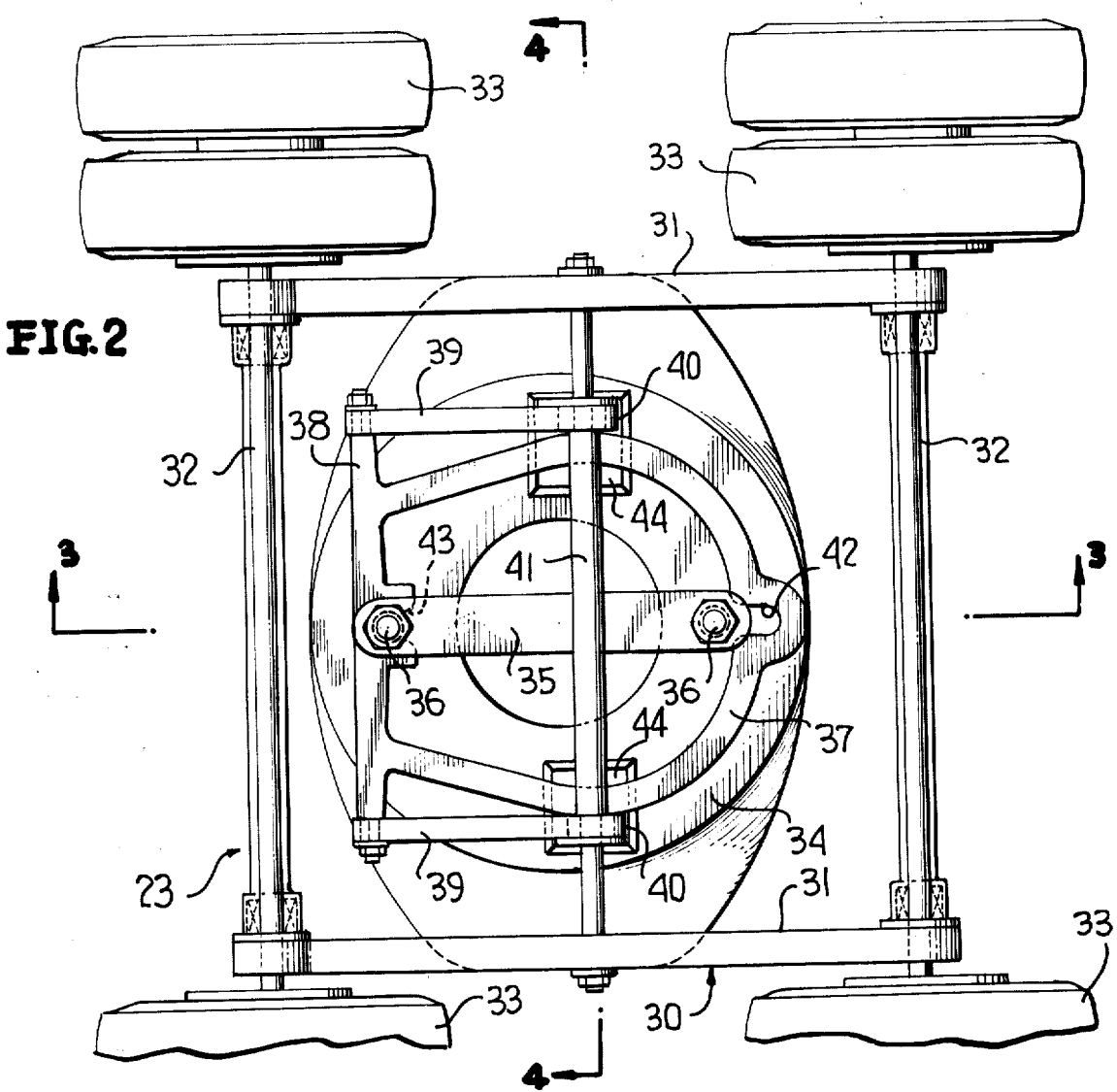
FIG. 2 is a bottom plan view of a steering truck forming the subject matter of the invention.
Figure 3:
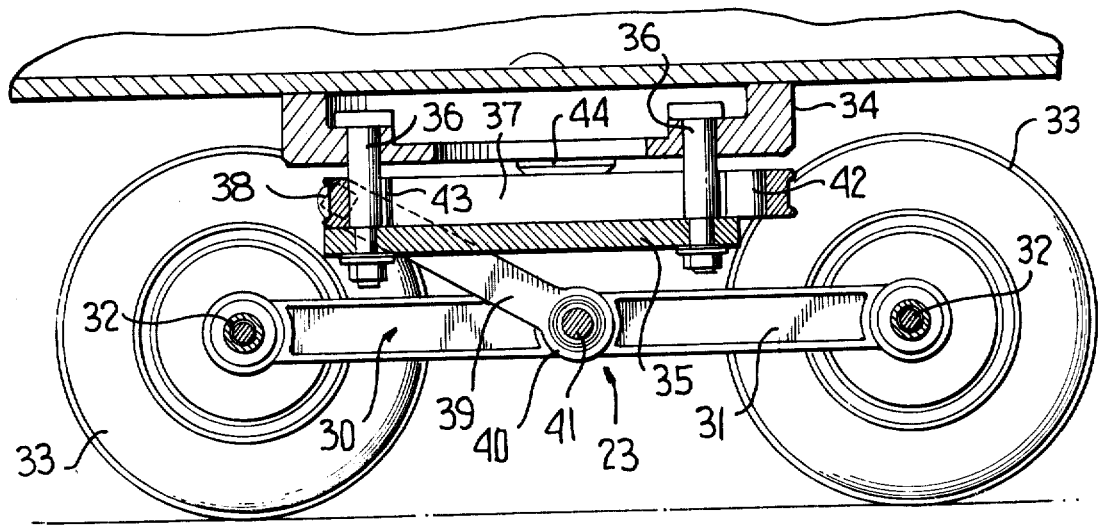
FIG. 3 is a vertical section taken on line 3—3 of FIG. 2.

Referring to the drawings in detail, the numeral 20 designates a towing truck or tractor for a semi-trailer 21. The semi-trailer and tractor are pivotally coupled by the customary fifth wheel king pin coupling 22 which may be entirely conventional. The invention proper is embodied in a steering truck designated generally by the numeral 23. As will be described, the truck 23 forms a caster-like support and steering unit for the rear end of a long semi-trailer 21, or alternately, it may be employed in a plural articulated vehicle caravan, FIG. 1, consisting of the semi-trailer 21 and an additional foreshortened trailer 24 coupled to the semi-trailer by a coupling unit 25. The invention is versatile in its usage, inasmuch as it is adaptable to standard semi-trailers, extra long semi-trailers, or plural articulated trailers of the type shown in FIG. 1. In the latter instance, the coupling unit 25 consists of hook-like coupling pin elements 26 received by longitudinally slotted drawbars 27 on the rear of the leading semi-trailer. The coupling pin elements 26 and the receiving drawbars 27 are separated laterally and the arrangement is such that limited pivoting may take place between the two trailer units 21 and 24, the degree of this pivoting will depend upon the play allowed for the coupling pins 26 in the slotted drawbars 27. The remainder of the automatic steering of the caravan during forward travel or backing up is provided by the truck or trucks 23, yet to be described in detail. In some instances, as during docking operations in close quarters, it may be desirable to insert blocks or wedges into the slots 29 of drawbars 27, ahead of pins 26 to render the connection rigid between trailer units 21 and 24. Normally, on the highway, the described limited articulation between the two trailer units is provided through the coupling 25.

The caster-like truck 23 forming the main subject matter of the invention comprises a main horizontal truck frame 30 having side longitudinal members 31 and forward and rear transverse axle members 32. Dual wheel units 33 are conventionally mounted on the axle members 32 outboard of the frame sides 31 and at the four corners of the rectangular truck frame 30.

An upper plate 34 is firmly attached to the bottom of the semi-trailer or to both trailer units if a pair of units is employed. Spaced below the plate 34 in superposed relation is a lower plate 35 which is elongated in the fore and aft directions. The two plates 34 and 35 lie in parallel planes and are rigidly interconnected by sturdy longitudinally spaced vertical axis king pins 36 which form key elements of this invention, in connection with a unique dual castering mode of operation, to be described, which is completely automatic, safe and foolproof.

Arranged between the upper and lower plates 34 and 35 is a roughly U-shaped swivel frame 37 which is joined rigidly to a forward crossbar 38. The opposite ends of the crossbar 38 are attached rigidly to inclined arms 39 which form with the crossbar 38 a pulling and pushing yoke or driving frame between the swiveled frame 37 and the underlying truck frame 30. The lower ends of the two arms 39 are pivotally attached at 40 to a center rigid bar 41 on the wheeled truck frame 30, midway between the members 32.

The rear side of intermediate swivel frame 37 has a forwardly open slot 42 adapted to receive the rearward king pin 36 and, similarly, the crossbar 38 which is a part of the frame 37 has a rearwardly open slot 43 adapted to receive the forward king pin 36. The spacing of the two king pins 36 is sufficiently less than the spacing of the slots 42 and 43 so that when one king pin is engaged within one slot, such as the slot 43, FIG. 2, the other king pin is disengaged or separated from its slot. The entry or separation of the king pins from the slots 42 and 43 is initiated and controlled solely by relative shifting of the vehicle mounted plates 34 and 35 and the two king pins relative to the wheeled truck-mounted frame 37 and associated parts, tied into the truck frame 30. More particularly, when the caravan is pulled forwardly by tractor 20, the forward king pin 36 will be shifted into clutched engagement with the slot 43 while the second king pin is disengaged from the slot 42. Therefore, during forward travel of the caravan, the entire four wheeled truck or carriage 23 will operate as a large caster beneath the semi-trailer, pivoting about the vertical axis of the forward king pin 36, which is releasably locked in the forward slot 43. Like any caster, the vertical pivot axis is offset or forwardly of the caster wheel and steering and turning when the caravan negotiates curves and corners will take place automatically without any driver attention or control and without the need for control links or cables between the caster-like truck or trucks 23 and the tractor 20.

When the semi-trailer or dual vehicle caravan is backed up, the rear king pin 36 will shift into the rear slot 42 while the forward king pin separates from the forward slot 43. In this condition of the wheeled truck 23, the vertical pivot axis or caster axis coincides with the rear slot 42 and during steering maneuvers, while backing up, the truck 23 or trucks may swing freely to the extent required around the rearward caster king pin 36. In any case, the degree of the caster movement or pivoting will automatically respond to the turning movements of the tractor 20 under control of a driver. The degree of automatic steering, forwardly or rearwardly, will also be influenced by the degree of play or articulation in coupling 25. In all cases no mechanism or direct driver control is necessary to influence the caster-like operation of the steering trucks or truck 23 and their functioning is automatic in the same sense that a simple caster wheel on a chair or the like responds to movements of the chair in one direction or another. This is a safe and reliable mode of operation. The structure which provides it is highly simplified, sturdy, compact and economical. It is therefore practical.

The invention possesses an additional feature in the form of lubricated bearing pads 44 interposed between the upper plate 34 and relatively movable swivel frame 37. The weight of the vehicle body is transmitted through the broad upper plate 34 to the widely spaced bearing pads which may be greased or lubricated similarly to the king pin plates on tractors which tow heavy semi-trailers. The pads 44 add stability to the steering trucks and render them smooth turning while castering. The bearing pads 44 are preferably attached to swivel frame 37.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A steerable truck for articulated vehicles comprising a pair of superposed plate members the upper one of which is adapted for fixed attachment to the bottom of a trailer body or the like, a pair of fore and aft spaced pins rigidly interconnecting said plate members in spaced relation, a wheeled truck frame underlying said plate members, an intermediate frame disposed between said plate members for movement relative thereto and having fore and aft recess means spaced sufficiently greater than the spacing of the king pins so as to be selectively engageable with one or the other of said fore and aft pins to form a caster-like pivotal connection therewith, and rigid members interconnecting said intermediate frame and said underlying wheeled truck frame, whereby relative movements of the wheeled truck frame and said trailer body cause shifting of said intermediate frame relative to said fore and aft pins.

2. The structure as defined by claim 1, and said rigid members comprising a pair of laterally spaced arms pivoted to said wheeled truck frame and pivoted to said intermediate frame.

3. The structure as defined by claim 2, and bearing pads intervened between said intermediate frame and the uppermost of said pair of plate members.

4. The structure as defined by claim 1, and said wheeled truck frame being a four-wheeled generally rectangular normally horizontal truck frame, said rigid members comprising a pair of arms pivoted at corresponding ends to the truck frame near the longitudinal center thereof with the other corresponding ends of the arms pivoted to opposite sides of said intermediate frame, said intermediate frame lying in a horizontal plane between said superposed plate members.

5. The structure as defined by claim 1, and said recess means comprising a pair of opposing longitudinal slots which are respectively rearwardly and forwardly open to receive said pins, the spacing of the pins and slots being such that when one pin is engaged in one slot the other pin is disengaged from the other slot, whereby two separate caster pivots may be formed between said truck frame and said superposed plate members.

6. The structure of claim 1, and said upper plate member comprising a wide plate attachable directly to the bottom of a trailer body, and said lower plate member being a narrow longitudinal plate of sufficient width only to accommodate said pins.

7. A steerable truck for articulated vehicles comprising an upper plate member attachable to the bottom of an articulated vehicle body, a lower plate member spaced below the upper plate member in superposed parallel relation therewith, a pair of longitudinally spaced pins interconnecting said plate members as a unit, a shiftable frame interposed between said plate members and having a pair of longitudinally spaced and opposed slots for the reception of said pins selectively, the spacing of said pins and slots being such that when one pin is engaged in one slot to form a caster pivot the other pin is separated from the other slot, a wheeled truck having a frame disposed below said plate members and shiftable frame, and a pair of arms pivotally interconnecting the frame of the truck and said shiftable frame so that the latter will respond to fore and aft relative movements between the truck frame and said plate members and pins.

8. The structure of claim 7, and said truck frame having a cross member near its longitudinal center, and said arms having their lower ends pivoted to the cross member and their upper ends pivoted to said shiftable frame near the forward end thereof, said arms being inclined upwardly and forwardly from said cross member.

9. The structure of claim 8, and said shiftable frame being a horizontal yoke-like frame and bearing pads interposed between the top of the shiftable frame and the bottom of the upper plate member at the opposite sides of the shiftable frame.

* * * * *